(12) United States Patent
Jain et al.

(10) Patent No.: US 11,048,967 B2
(45) Date of Patent: Jun. 29, 2021

(54) APPROXIMATE STRING MATCHING IN A CYBER SECURITY ENVIRONMENT

(71) Applicant: Aetna Inc., Hartford, CT (US)

(72) Inventors: Salil Kumar Jain, Jackson Heights, NY (US); David Dyer, Centennial, CO (US)

(73) Assignee: Aetna Inc., Hartford, CT (US)

( * ) Notice: Subject to any disclaimer, the term of this patent is extended or adjusted under 35 U.S.C. 154(b) by 157 days.

(21) Appl. No.: 16/363,446

(22) Filed: Mar. 25, 2019

(65) Prior Publication Data

US 2020/0311469 A1   Oct. 1, 2020

(51) Int. Cl.
| | | |
|---|---|---|
| G06F 40/20 | (2020.01) | |
| G06K 9/62 | (2006.01) | |
| G06F 9/54 | (2006.01) | |
| G06F 21/31 | (2013.01) | |
| G06F 17/18 | (2006.01) | |
| G06F 40/289 | (2020.01) | |
| G06F 40/216 | (2020.01) | |
| G06F 40/211 | (2020.01) | |
| G06F 40/284 | (2020.01) | |

(52) U.S. Cl.
CPC ........... *G06K 9/6215* (2013.01); *G06F 9/542* (2013.01); *G06F 17/18* (2013.01); *G06F 21/31* (2013.01); *G06F 40/216* (2020.01); *G06F 40/289* (2020.01); *G06F 40/211* (2020.01); *G06F 40/284* (2020.01)

(58) Field of Classification Search
CPC combination set(s) only.
See application file for complete search history.

*Primary Examiner* — Vu B Hang
(74) *Attorney, Agent, or Firm* — Leydig, Voit & Mayer, Ltd.

(57) ABSTRACT

A method for performing approximate string matching comprises: obtaining a predefined distance error threshold and user information, the user information including a list of strings; calculating distance metrics for pairs of strings in the list of strings; determining a positive list and a negative list based on the calculated distance metrics for the pairs of strings; determining histogram representations of the list of strings; determining true positive rates and false positive rates for one or more histogram thresholds based on the positive list, the negative list, and calculated histogram distances between pairs within the histogram representations; and obtaining an acceptable histogram threshold from the one or more histogram thresholds based on an acceptable true positive rate and an acceptable false positive rate.

16 Claims, 7 Drawing Sheets

APPROXIMATE STRING MATCHING IN A CYBER SECURITY ENVIRONMENT

BACKGROUND

Levenshtein distance is a standard distance measure between two strings. Levenshtein distance is a string metric that indicates how similar or dissimilar two strings are to each other. Strings can contain alpha-numeric characters or symbols. Levenshtein distance between two strings provides a measure for a minimum number of single-character edits required to change one string into the other. Strings are composed of characters, and examples of characters include letters, numerical digits, punctuation marks, whitespace, tab, carriage return, and so on. In computing environments, strings are compared with each other in various contexts. For example, in authentication, passwords obtained from a user interface are compared with reference passwords to determine if they match. Furthermore, results of the string matching can inform decisions of a computing system, e.g., based on the passwords matching, granting the user access to a protected database.

SUMMARY

An embodiment of the disclosure provides a method for performing approximate string matching in a cyber security environment. The method is performed by a computer device comprising a processor and memory. The method comprises: obtaining a predefined distance error threshold and user information, the user information including a list of strings; calculating distance metrics for pairs of strings in the list of strings; determining a positive list and a negative list based on the calculated distance metrics for the pairs of strings; determining histogram representations of the list of strings; determining true positive rates and false positive rates for one or more histogram thresholds based on the positive list, the negative list, and calculated histogram distances between pairs within the histogram representations; obtaining an acceptable histogram threshold from the one or more histogram thresholds based on an acceptable true positive rate and an acceptable false positive rate; obtaining an input string; converting the input string to an input string histogram; and determining whether a comparison between the input string histogram and at least one of the histogram representations of the list of strings is within the acceptable histogram threshold.

An embodiment of the disclosure provides a server for performing approximate string matching in a cyber security environment. The server comprises a processor and a non-transitory computer readable medium with instructions stored thereon such that when the processor executes the instructions, the server is configured to: obtain a predefined distance error threshold and user information, the user information including a list of strings; calculate distance metrics for pairs of strings in the list of strings; determine a positive list and a negative list based on the calculated distance metrics for the pairs of strings; determine histogram representations of the list of strings; determine true positive rates and false positive rates for one or more histogram thresholds based on the positive list, the negative list, and calculated histogram distances between pairs within the histogram representations; obtain an acceptable histogram threshold from the one or more histogram thresholds based on an acceptable true positive rate and an acceptable false positive rate; and store the acceptable histogram threshold for approximate string matching.

An embodiment of the disclosure provides a non-transitory computer readable medium for performing approximate string matching. The non-transitory computer readable medium includes instructions stored thereon for performing: obtaining, by a server, a predefined distance error threshold and user information from a database, the user information including a list of strings; calculating, by the server, distance metrics for pairs of strings in the list of strings; determining, by the server, a positive list and a negative list based on the calculated distance metrics for the pairs of strings; determining, by the server, histogram representations of the list of strings; determining, by the server, true positive rates and false positive rates for one or more histogram thresholds based on the positive list, the negative list, and calculated histogram distances between pairs within the histogram representations; obtaining, by the server, an acceptable histogram threshold from the one or more histogram thresholds based on an acceptable true positive rate and an acceptable false positive rate; receiving, by the server, an input string from a user device; converting, by the server, the input string to an input string histogram; and determining, by the server, whether a comparison between the input string histogram and at least one of the histogram representations of the list of strings is within the acceptable histogram threshold.

DETAILED DESCRIPTION

Although Levenshtein distance is an important string metric, it has some drawbacks. Levenshtein distance can be expensive to compute since determining Levenshtein distance involves an iterative process with non-linear computations. Additionally, machine learning and data analytics algorithms are more difficult to apply when computing Levenshtein distances. This is because Levenshtein distance compares strings, and strings usually have a non-numeric nature. The non-numeric aspect of strings makes applying machine learning and data analytics less straightforward.

Embodiments of the disclosure provide a feature transform of strings to a numeric space which allows for fast distance computations. The numeric space makes applying machine learning and data analytics algorithms more straightforward.

Figure 1:
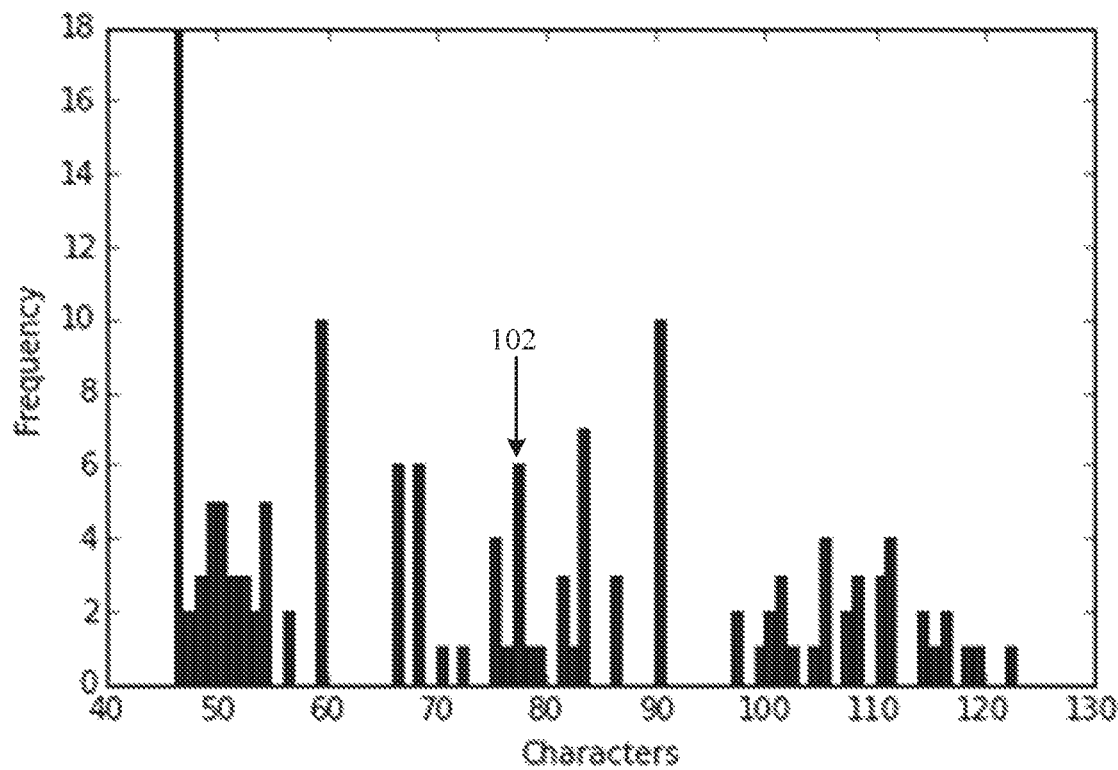
FIG. 1 illustrates a histogram feature according to an embodiment of the disclosure.

Embodiments of the disclosure provide a string transformation that is used in matching browser user agents for a same user. The string transformation includes computing frequency of various characters in a string and converting the string to a feature vector. The values in this feature vector are the frequencies of particular characters appearing in the string. The feature vector is a histogram feature. For example, a user agent string is given below:

Mozilla/5.0 (Windows NT 6.1; WOW64; Trident/7.0; SLCC2; .NET CLR 2.0.50727; .NET4. 0C; .NET4.0E; . NET CLR 3.5.30729; .NET CLR 3.0.30729; InfoPath.3; rv:11.0) like Gecko A histogram can be computed from the user-provided user agent string. FIG. 1 illustrates an example histogram for the user agent string. The X-axis of the histogram represents ASCII values of characters in the user agent string. The Y-axis of the histogram represents a character's frequency within the user agent string. For example, capital letter N in ASCII is 78, and capital letter N appears 6 times in the example user agent string. In the histogram, under character 78, a bar height of 6 is indicated as 102. As another example, capital letter O and capital letter P each appear once in the user agent string. Capital letter O and capital letter P correspond to ASCII values 79 and 80, respectively. It can be seen from FIG. 1 that each of the characters with ASCII values of 79 and 80 has a bar height of 1. Although ASCII is used as an example, other numerical conversions can be used, e.g., UTF and so on.

Figure 2:
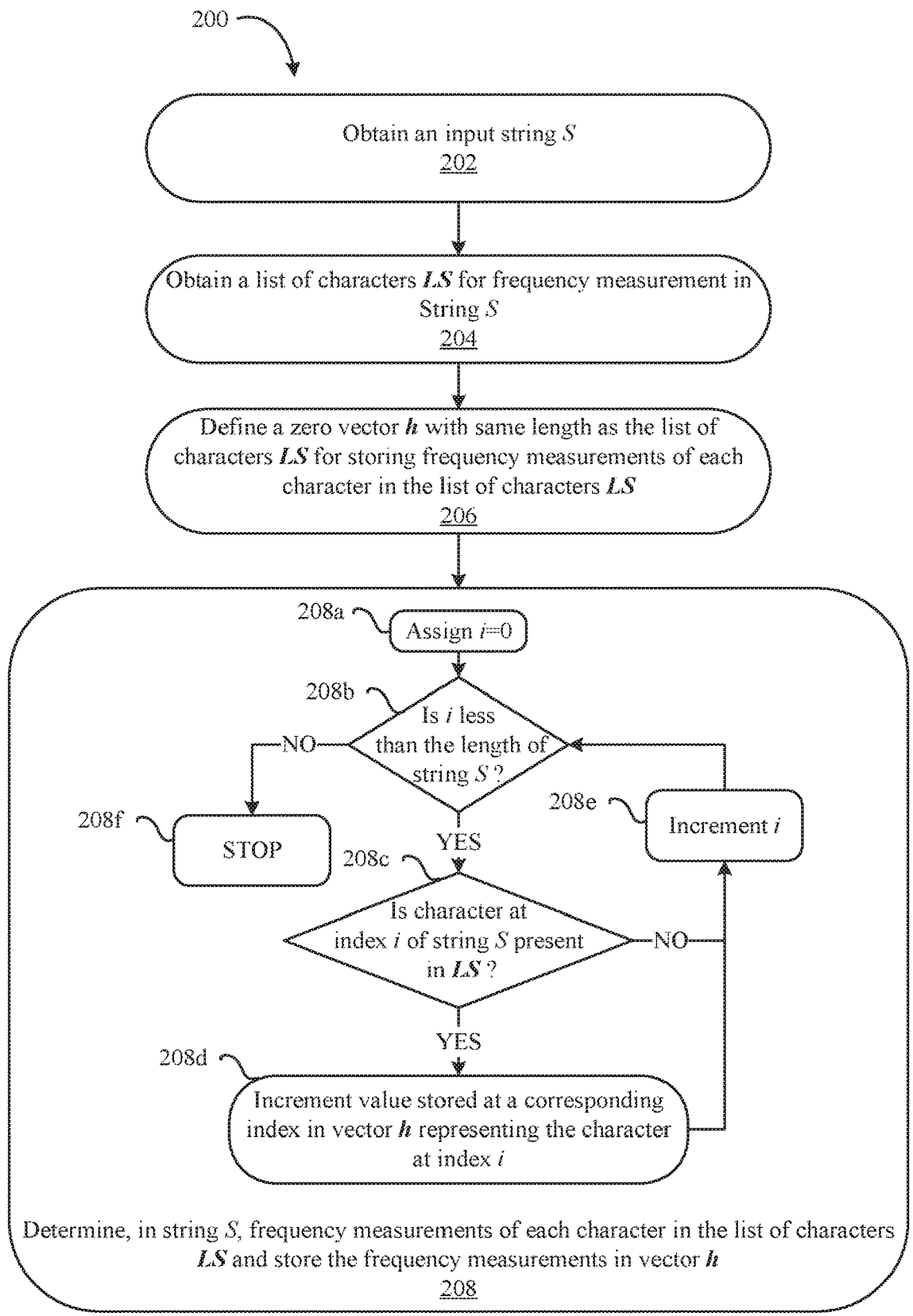
FIG. 2 illustrates a flow diagram for creating a histogram feature from an input string.

In some embodiments, transformation of a string to a histogram feature is an approximate representation of the string. That is, only a subset of characters in a given string are used to determine the feature histogram. FIG. 2 illustrates a process 200 performed by a computing device for creating a feature vector h (a histogram feature) of an input string S. At 202, the computing device obtains the input string S to be transformed.

At 204, the computing device obtains a list of characters LS for frequency measurement in string S. In some embodiments, string S contains more types of characters than a system designer cares for. For example, string S contains numbers, letters, and symbols, but the system designer is only concerned with the numbers and letters and not the symbols. Therefore, the list of characters LS will include only numbers and letters. In another example, only certain characters are of concern, e.g., capital letters A-Z, so the list of characters LS will include only capital letters A-Z.

At 206, the computing device defines the feature vector h as a zero vector. The feature vector h has a same length as the list of characters LS, therefore, there is a one-to-one correspondence in indices between the feature vector h and the list of characters LS. Each index of the feature vector h will store a frequency of the character identified by the same index in the list of characters LS.

At 208, the computing device determines, in string S, frequency measurements of each character in the list of characters LS. Furthermore, the computing device stores the frequency measurements in the feature vector h. An example process is provided within 208 to show one embodiment of how the feature vector h is populated given the list of characters LS and the input string S.

At 208a, the computing device assigns a temporary index variable i to 0. At 208b, the computing device checks whether variable i is less than the length of string S. If the variable i is not less than the length of string S, then the stopping condition is met and, at 208f, the process stops. If the process stops on a first pass, then the input string S is an empty string.

If at 208b, the variable i is less than the length of string S, then at 208c, the computing device determines whether the character at index i of string S is present in the list of characters LS. If the character is not present in the list of characters LS, then at 208e, the computing device increments i.

However, if the character at index i of string S is present in the list of characters LS, then at 208d, the computer device increments the value stored at an index in vector h, where the index corresponds to an index of the list of characters LS which holds the character at index i of string S.

In an example, the computing device receives "time to wake." as input string S at 202, and {a, e, i, o, u} as the list of characters LS at 204. At 206, the vector [0, 0, 0, 0, 0] is initialized as the feature vector h. h has the same length as the list of characters LS. After completing 208, the feature vector h will be [1, 2, 1, 1, 0], corresponding to 1 a, 2 e's, 1 i, 1 o, and 0 u's in "time to wake." In general, histogram transformation H function, according to an embodiment of the disclosure, transforms a string S to numerical spaces as follows: $h=H(S)=[f_a, f_b, \ldots, f_i, \ldots]$ where $i \in \{a, b, \ldots, z, A, B, \ldots, Z, 0, 1, \ldots, 9, ;, /, ,, .\}$ and $f_i$ is the number of times character i appears in the string S.

Since a histogram feature can be an approximation of the given string, not containing all characters of the input string, embodiments of the disclosure provide an efficacy measure to determine how well a string comparison using histogram features approximates a string comparison using Levenshtein distance. Efficacy measurements can be performed on a large dataset where a system may choose a predefined Levenshtein distance threshold for matching. Levenshtein distance and histogram distance (e.g., Manhattan distance between histograms) is calculated for all possible unique pairs in the dataset. All Levenshtein distances equal to or below threshold are marked positive and those above threshold are marked negative.

A histogram threshold for comparing histogram distances is changed in a monotonically increasing way. Percentage of positive samples, using the positive and negative sets generated via the Levenshtein distance, are determined for each increase in the histogram threshold. This percentage is called true positive rate. Analogously, a percentage of negative samples based on Levenshtein distance are marked positive based on the histogram threshold. This percentage is called false positive rate. A curve can be drawn based on different histogram distances, and this curve can represent an efficacy measure. A system designer may choose a histogram distance threshold where a certain false positive rate is acceptable. A high true positive rate and a low false positive rate is generally desirable.

Figure 3:
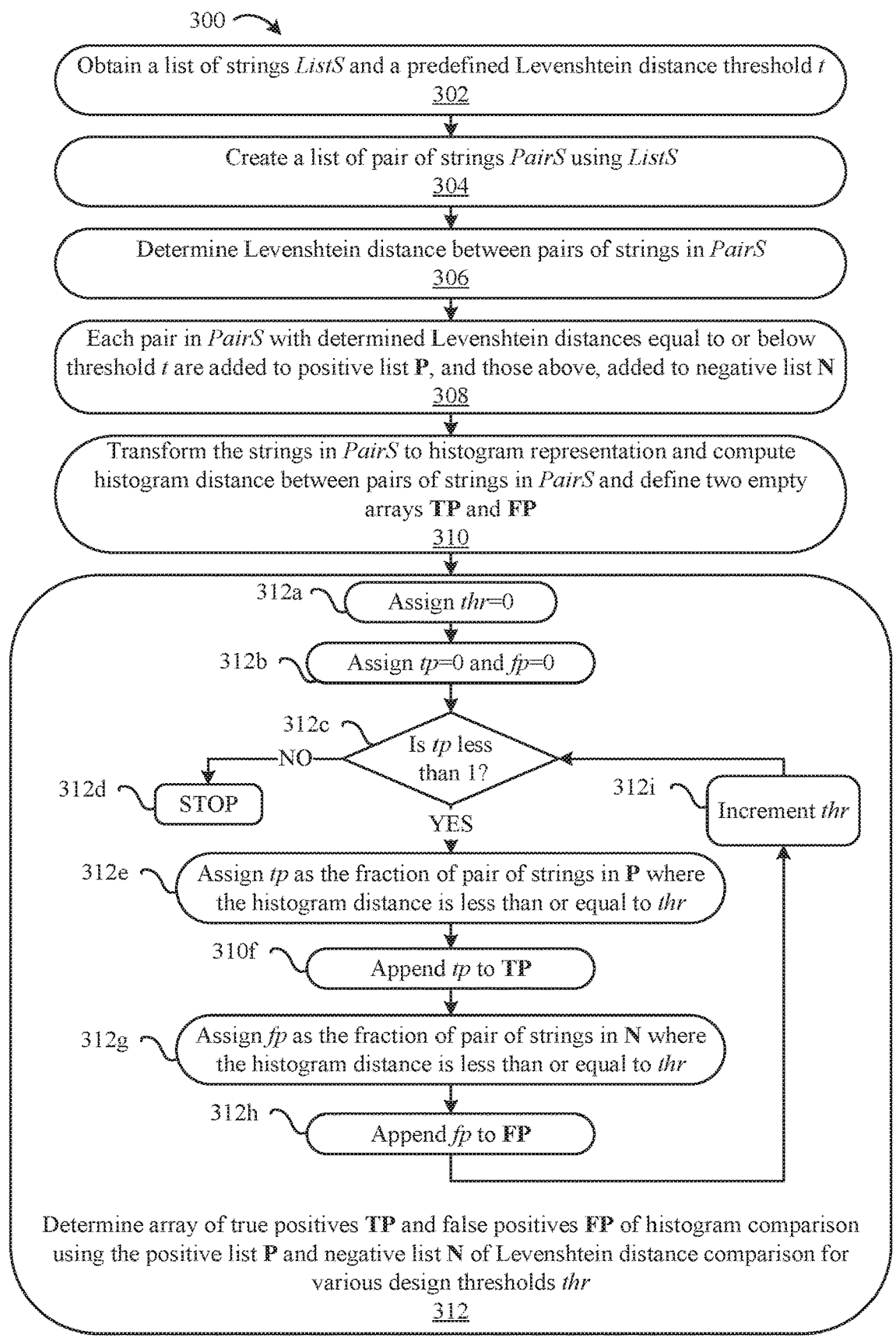
FIG. 3 illustrates a flow diagram for determining true positive rates and false positive rates for various histogram distances given a Levenshtein distance.

FIG. 3 illustrates a flow diagram 300 for determining true positive rates and false positive rates for various histogram distances for a given Levenshtein distance. At 302, a computing device obtains a list of strings ListS and a predefined Levenshtein distance threshold t. The list of strings ListS can include a large number of strings, e.g., about 500 thousand strings. The list of strings ListS can also include duplicate strings within the 500 thousand strings. The predefined Levenshtein distance threshold t or, in shorthand, threshold t, is a system designer's target Levenshtein distance. For example, a system designer may want to design a system where two strings with a Levenshtein distance less than 5 are treated as containing the same information. In this example, threshold t is 5.

At 304, the computing device creates a list of pair of strings PairS using ListS. PairS contains a combination of strings in ListS taken two at a time, i.e., each item in PairS is two strings of ListS. The number of pairs of strings in PairS can be around 270 thousand pairs for 500 thousand strings with duplicate strings.

At 306, the computing device determines Levenshtein distances between the pairs of strings in PairS. For each item in PairS, a Levenshtein distance is calculated.

At 308, the computing device separates or bins each item in PairS based on the determined Levenshtein distance of the item and the threshold t. Two bins are created: (1) a positive list P for items in PairS with Levenshtein distances less than or equal to threshold t, and (2) a negative list N for items in PairS with Levenshtein distances greater than threshold t.

By performing 302 to 308, the computing device evaluates all strings in ListS by determining how unique each string is from every other string in ListS, applying a threshold t to each comparison so that every comparison that does not exceed the threshold t is determined to have two strings that are virtually treated as the same string or contain the same information. The positive list P contains pairs of strings with each pair treated as two strings that virtually contain the same information. The negative list N contains pairs of strings with each pair treated as two strings that do not contain the same information. Performing 302 to 308 provides a baseline for evaluating comparisons of transformed histogram features according to embodiments of the disclosure.

At 310, the computing device transforms strings in PairS to histogram representations according to embodiments of the disclosure. For each string in PairS, the transformation can be performed according to process 200. Furthermore, after determining the histogram representations or histogram feature vectors of the strings in PairS, the computing device computes histogram distance for each item (each pair of strings) in PairS. In an embodiment, histogram distance computation of each item involves determining a Manhattan distance for each item in PairS. In another embodiment, histogram distance computation involves determining a Euclidean distance and/or a Minkowski distance for each item in PairS. The computing device then initializes two empty arrays: (1) an array of true positives TP, and (2) an array of false positives FP.

At 312, the computing device applies different design thresholds thr to the histogram distances calculated at 310 and populates the array of true positives TP and false positives FP, based on the positive list P and the negative list N determined at 308. In an embodiment, 312a through 312i shows a process of accomplishing this.

At 312a, the computing device initially sets threshold thr to 0. At 312b, the computing device initializes two temporary variables, tp and fp, to 0. At 312c, the computing device determines whether tp is less than 1. If tp is not less than 1, then the process terminates at 312d.

If tp is less than 1, then at 312e, the computing device assigns, to tp, the fraction of pairs of strings in the positive list P where the histogram distance is less than or equal to the threshold thr. That is, the computing device applies the threshold thr to the histogram distances calculated at 310. Histogram distances that are equal to or below the threshold thr are binned as histogram positive, and distances that are above the threshold thr are binned as histogram negatives. The computing device then determines pairs of strings binned as histogram positive that are contained in the positive list P. tp is assigned as the percentage of P that contains pairs of strings identified as histogram positive.

At 312f, the computing device appends tp to the array of true positives TP.

At 312g, the computing device assigns, to fp, the fraction of pairs of strings in the negative list N where the histogram distance is less than or equal to the threshold thr. After determining the histogram positive and histogram negative bins, the computing device determines pairs of strings binned as histogram positive that are contained in the negative list N. fp is assigned as the percentage of N that contains pairs of strings identified as histogram positive.

At 312h, the computing device appends fp to the array of false positives FP.

At 312i, the threshold thr is incremented and the process continues to 312c to determine whether tp is less than 1.

Process 300 results in providing an array of true positives TP and an array of false positives FP corresponding to one another. That is, for some value i, an index i of TP and an index i of FP correspond to values determined using a same design threshold thr. For a predefined Levenshtein distance threshold t, process 300 will provide a TP and an FP array that contain values for multiple design thresholds thr. Therefore, by varying Levenshtein distance threshold t, multiple TP and FP arrays can be obtained. TP and FP arrays can be displayed graphically. An example of such is provided in FIG. 4.

Figure 4:
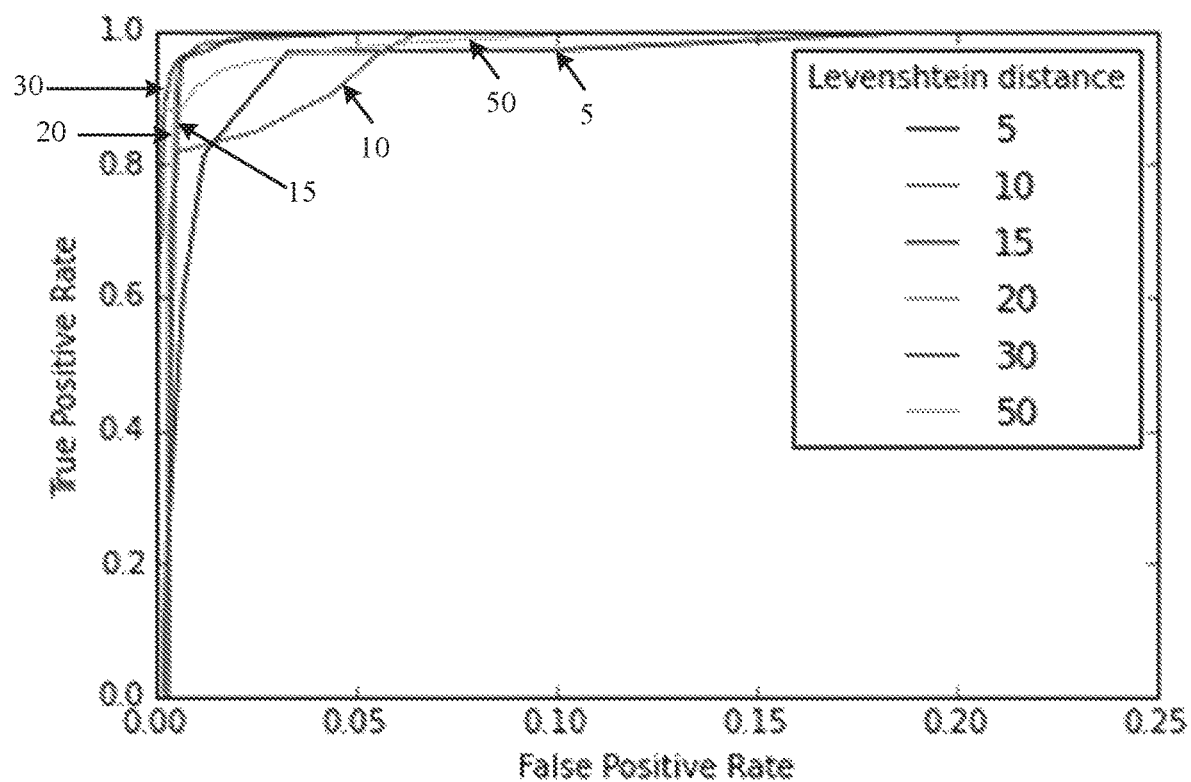
FIG. 4 illustrates an example of true positive rate vs false positive rate curves for different Levenshtein distances.

FIG. 4 shows several plots of true positive rates vs. false positive rates as Levenshtein distance threshold t is varied, according to an embodiment of the disclosure. Example plots are shown for Levenshtein distance threshold t=5, 10, 15, 20, 30, and 50. For readability, markers are placed corresponding to the legend to distinguish one plot from another. A system designer tasked to design a system that distinguishes strings within a certain Levenshtein distance can generate a graph like FIG. 4. The designer can then use the graph to choose an acceptable false positive rate and true positive rate that her system can handle for the Levenshtein distance chosen. The false positive rate and true positive rate chosen will indicate a histogram threshold thr for designing the system. In practice, the true positive rate should be as high as possible while the false positive rate should be as low as possible. Thus, FIG. 4 can be used as an efficacy measure of how well a histogram comparison of strings performs.

FIG. 4 is used as an example for explanation purposes. After the computing device obtains the TP and FP array at 312, instead of graphing the results, the computing device can apply algorithms that determine an acceptable true positive rate and an acceptable false positive rate, and infer the histogram threshold thr that achieves those rates. For example, an algorithm which takes either a true positive rate or a false positive rate and determines the other along with the histogram threshold thr needed to achieve the true positive rate and the false positive rate can be applied.

Figure 5:
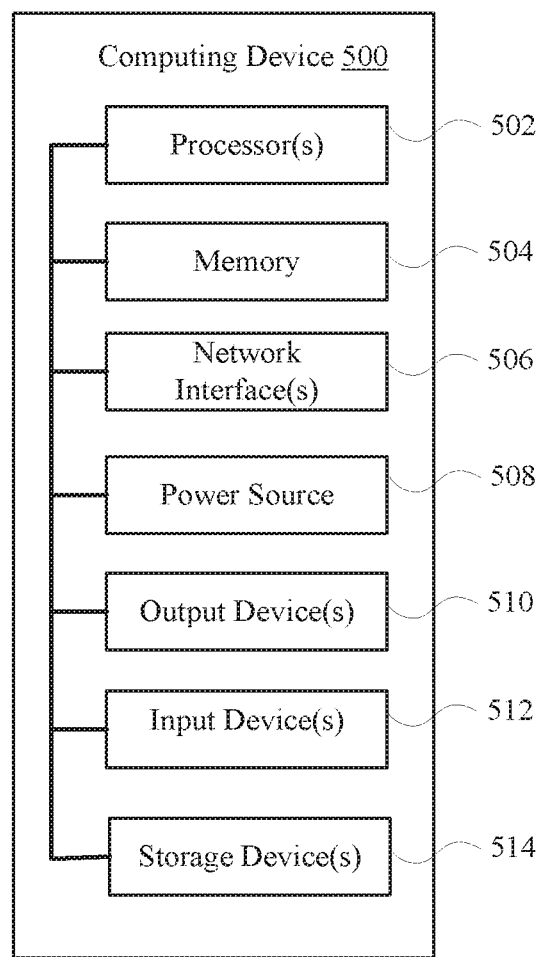
FIG. 5 illustrates components of a computing device according to some example embodiments.

FIG. 5 is a block diagram illustrating basic hardware components of a computing device 500, according to some example embodiments. The computing device 500 may include one or more processors 502, memory 504, network interfaces 506, power source 508, output devices 510, input devices 512, and storage devices 514. To simplify the discussion, the singular form will be used for all components identified in FIG. 5, when appropriate, but the use of the singular does not limit the discussion to only one of each component. For example, multiple processors may implement functionality attributed to processor 502.

Processor 502 is configured to implement functions and/or process instructions for execution within the computing device 500. For example, processor 502 executes instructions stored in memory 504 or instructions stored on a storage device 514. In certain embodiments, instructions stored on storage device 514 are transferred to memory 504 for execution at processor 502. Memory 504, which may be a non-transient, computer-readable storage medium, is configured to store information within the device 500 during operation. In some embodiments, memory 504 includes volatile memories such as RAM, dynamic random access memories (DRAM), and static random access memories (SRAM). Memory 504 also maintains program instructions for execution by the processor 502 and serves as a conduit for other storage devices (internal or external) coupled to the computing device 500 to gain access to processor 502.

Storage device 514 includes one or more non-transient computer-readable storage media configured for long-term storage of information. In some embodiments, the storage device 514 includes floppy discs, flash memories, magnetic hard discs, optical discs, solid state drives, or forms of electrically programmable memories (EPROM) or electrically erasable and programmable (EEPROM) memories.

Network interfaces 506 are used to communicate with external devices and/or servers. The computing device 500 may include multiple network interfaces 506 to facilitate communication via multiple types of networks. Network interfaces 506 may include network interface cards, such as Ethernet cards, optical transceivers, radio frequency transceivers, or any other type of device that can send and receive information. Examples of network interfaces 506 include radios compatible with several Wi-Fi standards, 3G, 4G, Long-Term Evolution (LTE), Bluetooth®, etc.

Power source 508 provides power to the computing device 500. Examples include rechargeable or non-rechargeable batteries utilizing nickel-cadmium or other suitable material. Power source 508 may include a regulator for regulating power from the power grid in the case of a device plugged into a wall outlet.

The computing device 500 may also be equipped with one or more output devices 510. Output device 510 is configured to provide output to a user using tactile, audio, and/or video information. Examples of output device 510 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to a user of the computing device 500.

The computing device 500 may also be equipped with one or more input devices 512. Input devices 512 are configured to receive input from a user or the environment where the computing device 500 resides. In certain instances, input devices 512 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

Figure 6:
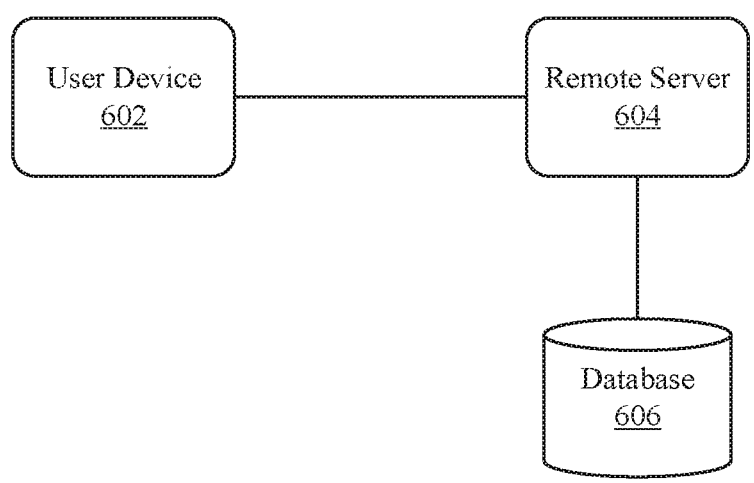
FIG. 6 illustrates a networked system according to an embodiment of the disclosure.

In an embodiment, FIG. 6 provides a system for authenticating a user. The system includes a user device 602, a remote server 604, and/or a database 606. The remote server 604 provides the user device 602 access to the database 606. Examples of the remote server 604 include one or more computing servers, desktop computers, and so on. Examples of the user device 602 include desktop computers, laptop computers, mobile phones, and so on.

Figure 7:
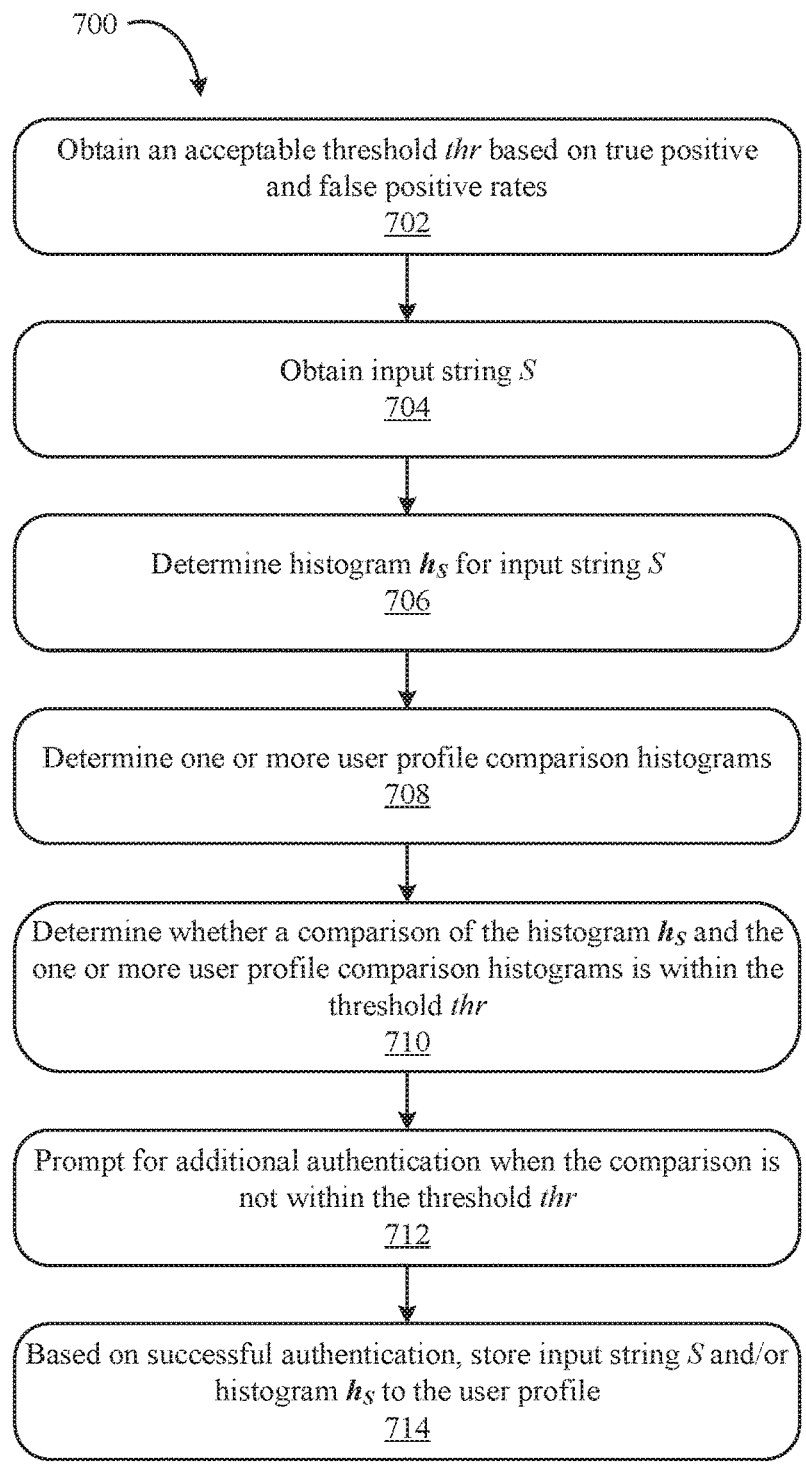
FIG. 7 illustrates a flow diagram for determining whether to authenticate a user, according to an embodiment of the disclosure.

In the system illustrated in FIG. 6, the remote server 604 manages user profiles. User profiles can include a user's name, a username, email, password, security questions, answers to the security questions, and tracking information. Tracking information may include user agents that a user has previously used to access the remote server 604, internet protocol (IP) address, and so on. User agents identify software that act on behalf of a user, and can be stored in the user's profile as a string. An example of a user agent is provided below:

Mozilla/5.0 (Windows NT 6.1; WOW64; Trident/7.0; SLCC2; .NET CLR 2.0.50727; .NET CLR 3.5.30729; .NET CLR 3.0.30729; Media Center PC 6.0; .NET4.0C; .NET4.0E; rv:11.0) like Gecko FIG. 7 illustrates a flow diagram of a process 700 performed by the remote server 604 for determining whether to authenticate a user on the user device 602. At 702, the remote server 604 obtains an acceptable threshold thr based on true positive and false positive rates, according to embodiments of the disclosure. The acceptable threshold thr can be read from a user's profile or can be obtained from a storage on the remote server 604 or the database 606.

At 704, the remote server 604 obtains an input string S. In an embodiment, the input string S is a user agent obtained from the user device 602.

At 706, the remote server 604 determines a histogram $h_s$ for input string S.

At 708, the remote server 604 determines one or more user profile comparison histograms. That is, the remote server 604 obtains from the user profile a list of strings to compare to the input string S and converts each string in the list of strings to a histogram representation. In some embodiments, the user profile contains a list of histogram features, and the remote server 604 obtains the list of histogram features from the user profile. In an embodiment, the list of strings are user agents saved in the user profile and the list of histogram features correspond to transformation of the user agents into histogram representation.

At 710, the remote server 604 determines whether a comparison of the histogram $h_s$ with any one of the one or more user profile comparison histograms is within the threshold thr. That is, the remote server 604 tries to find at least one histogram feature that is at most a threshold thr histogram distance from $h_s$.

At 712, the remote server 604 prompts for additional authentication when no comparison at step 710 yields a histogram distance that is at most threshold thr. At this point, the remote server 604 determines that the input string S is not contained within the user's profile, so the remote server 604 requires that the user device 602 authenticate.

At 714, based on a successful authentication, the remote server 604 stores the input string S and/or the histogram $h_s$ to the user profile.

Embodiments of the disclosure provide a system and method for transforming user agents into numerical vectors which can be used for distance computation, machine learning and data analytics purposes. Embodiments of the disclosure further provide a method of evaluating the transformations by determining how well the transformations perform in relation to Levenshtein distances.

Embodiments of the disclosure can be integrated in authentication and authorization systems for checking browser user agents. Browser user agents can be tied to users through user profiles to improve security. For example, if a user comes from a different browser user agent (or an unrecognized browser), extra authentication may be required. Embodiments of the disclosure provide a histogram transformation and use histogram distances for comparing strings. Since histogram distance allows for variance in user agents, minor changes in user agents are accommodated. In cases of minor changes, a user does not need to be prompted for extra authentication every time the user changes a browser version, for example.

Furthermore, histogram distance can work better than Levenshtein distance in some cases. For example, histogram distance accommodates different location of the same elements in a user agent. Two user agents are provided below:

Mozilla/5.0 (Windows NT 6.1; WOW64; Trident/7.0; SLCC2; .NET CLR 2.0.50727; .NET CLR 3.5.30729; .NET CLR 3.0.30729; Media Center PC 6.0; .NET4.0C; .NET4.0E; rv:11.0) like Gecko Mozilla/5.0 (Windows NT 6.1; WOW64; Trident/7.0; SLCC2; .NET CLR 2.0.50727; .NET CLR 3.5.30729; .NET CLR 3.0.30729; .NET4.0C; .NET4.0E; Media Center PC 6.0; rv:11.0) like Gecko In the user agents provided, the elements of the user agents are identical, but the emphasized element appears at different locations in the two user agents. The Levenshtein distance of the above two user agents is 36 while the histogram distance of the two user agents is 0. Embodiments of the disclosure provide efficient approximate matching of user agents and allow application of different machine learning algorithms to user agent string. Transforming strings into a histogram representation and computing histogram distances increases comparison speed when compared to Levenshtein distance comparisons. The increased speed allows for real-time computation. As discussed above, the use of histogram representations is immune to string elements having different locations. This is advantageous since a system will conserve storage space by not storing only one representation of a string instead of multiple representations of the same string that differ only in placement of elements.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for performing approximate string matching in a cyber security environment, the method performed by a computer device comprising a processor and memory, the method comprising:
   obtaining a predefined distance error threshold and user information, the user information including a list of strings;
   calculating distance metrics for pairs of strings in the list of strings;
   determining a positive list and a negative list based on the calculated distance metrics for the pairs of strings;
   determining histogram representations of the list of strings;
   determining true positive rates and false positive rates for one or more histogram thresholds based on the positive list, the negative list, and calculated histogram distances between pairs within the histogram representations;
   obtaining a predetermined histogram threshold from the one or more histogram thresholds based on a predetermined true positive rate and a predetermined false positive rate;
   obtaining an input string;
   converting the input string to an input string histogram;
   determining whether a comparison between the input string histogram and at least one of the histogram representations of the list of strings is within the predetermined histogram threshold;
   prompting for additional authenticating information when the comparison between the input string histogram and at least one of the histogram representations of the list of strings is greater than the predetermined histogram threshold; and
   based on successfully verifying the additional authenticating information, storing the input string to a user profile.

2. The method according to claim 1, wherein the user information comprises browser user agents.

3. The method according to claim 1, wherein the distance metrics calculated are Levenshtein distances between the pairs of strings in the list of strings.

4. The method according to claim 1, wherein the histogram distances calculated are Manhattan distances.

5. The method according to claim 1, wherein for a representative string, determining the histogram representations of the list of strings comprises:
   obtaining a predefined list of characters;
   determining, in the representative string, frequency measurements of each character in the predefined list of characters; and
   storing a vector including the frequency measurements, the vector being the histogram representation of the representative string.

6. The method according to claim 1, wherein determining the positive list and the negative list comprises:

determining that the positive list includes pairs of strings with distance metrics less than or equal to the predefined distance error threshold; and determining that the negative list includes pairs of strings with distance metrics greater than the predefined distance error threshold.

7. The method according to claim 6, wherein for a representative histogram threshold in the one or more histogram thresholds, determining the true positive rates and the false positive rates comprises:

determining that the true positive rate for the representative histogram threshold is a fraction of pairs of strings in the positive list with calculated histogram distances less than or equal to the representative histogram threshold; and determining that the false positive rate for the representative histogram threshold is a fraction of pairs of strings in the negative list with calculated histogram distances less than or equal to the representative histogram threshold.

8. The method according to claim 1, wherein the input string is a browser user agent.

9. A server for performing approximate string matching in a cyber security environment, the server comprising a processor and a non-transitory computer readable medium with instructions stored thereon such that when the processor executes the instructions, the server is configured to:

obtain a predefined distance error threshold and user information, the user information including a list of strings;

calculate distance metrics for pairs of strings in the list of strings;

determine a positive list and a negative list based on the calculated distance metrics for the pairs of strings;

determine histogram representations of the list of strings;

determine true positive rates and false positive rates for one or more histogram thresholds based on the positive list, the negative list, and calculated histogram distances between pairs within the histogram representations;

obtain a predetermined histogram threshold from the one or more histogram thresholds based on a predetermined true positive rate and a predetermined false positive rate;

obtain an input string;

convert the input string to an input string histogram;

determine whether a comparison between the input string histogram and at least one of the histogram representations of the list of strings is within the predetermined histogram threshold;

prompt for additional authenticating information when the comparison between the input string histogram and at least one of the histogram representations of the list of strings is greater than the predetermined histogram threshold; and based on successfully verifying the additional authenticating information, store the input string to a user profile.

10. The server according to claim 9, wherein the user information comprises browser user agents.

11. The server according to claim 9, wherein the distance metrics calculated are Levenshtein distances between the pairs of strings in the list of strings.

12. The server according to claim 9, wherein the histogram distances calculated are Manhattan distances.

13. The server according to claim 9, wherein for a representative string, the server is configured to determine the histogram representations of the list of strings by:

obtaining a predefined list of characters;

determining, in the representative string, frequency measurements of each character in the predefined list of characters; and storing a vector including the frequency measurements, the vector being the histogram representation of the representative string.

14. The server according to claim 9, configured to determine the positive list and the negative list by:

determining that the positive list includes pairs of strings with distance metrics less than or equal to the predefined distance error threshold; and determining that the negative list includes pairs of strings with distance metrics greater than the predefined distance error threshold.

15. The server according to claim 14, wherein for a representative histogram threshold in the one or more histogram thresholds, the server is configured to determine the true positive rates and the false positive rates by:

determining that the true positive rate for the representative histogram threshold is a fraction of pairs of strings in the positive list with calculated histogram distances less than or equal to the representative histogram threshold; and determining that the false positive rate for the representative histogram threshold is a fraction of pairs of strings in the negative list with calculated histogram distances less than or equal to the representative histogram threshold.

16. A non-transitory computer readable medium for performing approximate string matching, the non-transitory computer readable medium including instructions stored thereon for performing:

obtaining, by a server, a predefined distance error threshold and user information from a database, the user information including a list of strings;

calculating, by the server, distance metrics for pairs of strings in the list of strings;

determining, by the server, a positive list and a negative list based on the calculated distance metrics for the pairs of strings;

determining, by the server, histogram representations of the list of strings;

determining, by the server, true positive rates and false positive rates for one or more histogram thresholds based on the positive list, the negative list, and calculated histogram distances between pairs within the histogram representations;

obtaining, by the server, an acceptable histogram threshold from the one or more histogram thresholds based on an acceptable true positive rate and an acceptable false positive rate;

receiving, by the server, an input string from a user device;

converting, by the server, the input string to an input string histogram; and determining, by the server, whether a comparison between the input string histogram and at least one of the histogram representations of the list of strings is within the acceptable histogram threshold.

* * * * *